(12) United States Patent
Duggal

(10) Patent No.: US 12,157,577 B2
(45) Date of Patent: *Dec. 3, 2024

(54) FABRIC OR FLEXIBLE MATERIAL WITH HOT MELT ADHESIVE FOR INFLATABLE SAFETY PRODUCTS

(71) Applicant: Air Cruisers Company, LLC, Wall Township, NJ (US)

(72) Inventor: Deepak Duggal, Wall Township, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,939

(22) Filed: Dec. 22, 2022

(65) Prior Publication Data

US 2024/0208655 A1 Jun. 27, 2024

(51) Int. Cl.
*B64D 25/00* (2006.01)
*C09J 7/21* (2018.01)
(Continued)

(52) U.S. Cl.
CPC ............... *B64D 25/00* (2013.01); *C09J 7/21* (2018.01); *C09J 7/35* (2018.01); *D06M 17/04* (2013.01);
(Continued)

(58) Field of Classification Search
CPC .... C09J 7/22; C09J 2301/16; C09J 2400/163; C09J 7/21; C09J 7/35; C09J 2203/35; C09J 2301/12; C09J 2301/304; C09J 2400/263; B64D 25/00; B64D 25/14; B64D 25/18; D06M 17/04; D06M 2200/30; D06M 2200/35; B29C 66/5221; B29C 65/18; B29C 66/73921; B29C 66/24221; B29C 66/439; B29C 66/54; B29C 66/133; B29C 66/729; B29C 66/0384; B29C 65/08; B29C 65/10; B29C 65/04; B29D 22/02;
(Continued)

(56) References Cited

U.S. PATENT DOCUMENTS

| 2006/0165939 A1* | 7/2006 | Hottner | B32B 27/12 |
| | | | 156/304.3 |
| 2009/0220726 A1* | 9/2009 | Liggett | C09J 7/29 |
| | | | 428/411.1 |
| 2010/0266801 A1* | 10/2010 | Jahoda | E06B 9/24 |
| | | | 428/339 |

FOREIGN PATENT DOCUMENTS

| CN | 101735736 A | 6/2010 |
| CN | 205560038 U | 9/2016 |

(Continued)

OTHER PUBLICATIONS

International Application No. PCT/US2023/084682, International Search Report and Written Opinion mailed on Apr. 15, 2024, 9 pages.

*Primary Examiner* — Patricia L. Nordmeyer
(74) *Attorney, Agent, or Firm* — Kilpatrick Townsend & Stockton LLP

(57) ABSTRACT

Described is a fabric or flexible composite material for an inflatable safety product. The fabric or flexible composite material includes a substrate and a hot melt adhesive on the substrate. The substrate and hot melt adhesive may include a same base polymer. A method of forming an inflatable safety product includes forming a fabric or flexible composite material by applying a hot melt adhesive to a substrate using heat and pressure.

26 Claims, 2 Drawing Sheets

(51) Int. Cl.
*C09J 7/35* (2018.01)
*D06M 17/04* (2006.01)
(52) U.S. Cl.
CPC ........ *C09J 2203/35* (2020.08); *C09J 2301/12* (2020.08); *C09J 2301/304* (2020.08); *C09J 2400/163* (2013.01); *C09J 2400/263* (2013.01); *D06M 2200/30* (2013.01); *D06M 2200/35* (2013.01)
(58) Field of Classification Search
CPC ..... B29L 2031/3067; B29L 2031/5254; B29L 2031/3076; B29L 2031/485; B29L 2022/02; B63C 9/1255; B63C 9/04; B29K 2995/0067
See application file for complete search history.

(56) References Cited

FOREIGN PATENT DOCUMENTS

| WO | WO-2021005083 A1 * | 1/2021 | ............ C09J 175/04 |
| WO | 2022039814 A2 | 2/2022 | |

* cited by examiner

FABRIC OR FLEXIBLE MATERIAL WITH HOT MELT ADHESIVE FOR INFLATABLE SAFETY PRODUCTS

FIELD OF THE INVENTION

The field of the invention relates to air-holding and component or accessory fabrics or flexible composite materials, and, more particularly, to fabrics or flexible composite materials for an inflatable safety product.

BACKGROUND

Federal aviation safety regulations require aircraft to provide evacuation and other safety provisions for passengers. These include evacuation slides, evacuation slide/rafts, ramps, slide/ramps, life rafts, life vests, helicopter floats, and other life-saving inflatable devices. Relevant inflatable products that can be improved using the fabrics or flexible composite materials of the present disclosure can include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions. These inflatable devices are generally built from an assembly of inflatable tubular structures that form air beams that are sealed to one another. Inflatable escape slides and life rafts also have non-air-holding features, such as floors, sliding surfaces, girts, patches, handles, pouches, containers, structural attachments, accessories, components, and other features.

Typically, in order to form the tubular structures, many pieces of fabric or flexible composite material (which may be referred to herein as panels) are joined together. Safety regulations set strength requirements for the fabric or flexible composite material itself (the field of the inflatable tube), as well as strength requirements for the seam areas. In certain embodiments, the tubular structures may be substantially leak proof when inflated to keep the inflation gas inside the tubes for long durations.

Conventional fabrics or flexible composite material for inflatable safety products utilize polyamide substrates that are coated with solvent-based polyurethane coatings on opposing surfaces of the substrate. The solvent-based polyurethane coating on the outside surface of the substrate provides abrasion resistance, heat resistance, and the means to adhere seam tapes, components, accessories, and/or other fabrics to the outside surface of the fabric. The solvent-based polyurethane coating on the inside surface of the substrate provides a gas barrier layer to the substrate to create an air-holding or gas-holding fabric. Such conventional solvent-based polyurethane coatings require complex manufacturing processes with long production cycle times, long cure times, and high labor costs and generally have negative environmental impacts that pose risks to the health and safety of the workplace. Conventional fabrics or flexible composite material with solvent-based polyurethane coatings are also generally heavy, thereby taking up weight on vehicles with weight restrictions such as aircraft.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a fabric or flexible composite material for an inflatable safety product includes a substrate and a hot melt adhesive on the substrate.

According to certain embodiments of the present invention, a fabric or flexible composite material for an inflatable safety product, the fabric or flexible composite material comprising a substrate and a hot melt adhesive on the substrate, wherein the substrate and the hot melt adhesive comprise a same base polymer.

According to certain embodiments of the present invention, a method of forming an inflatable safety product, the method comprising forming a fabric or flexible composite material by applying a hot melt adhesive to a substrate using heat and pressure.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
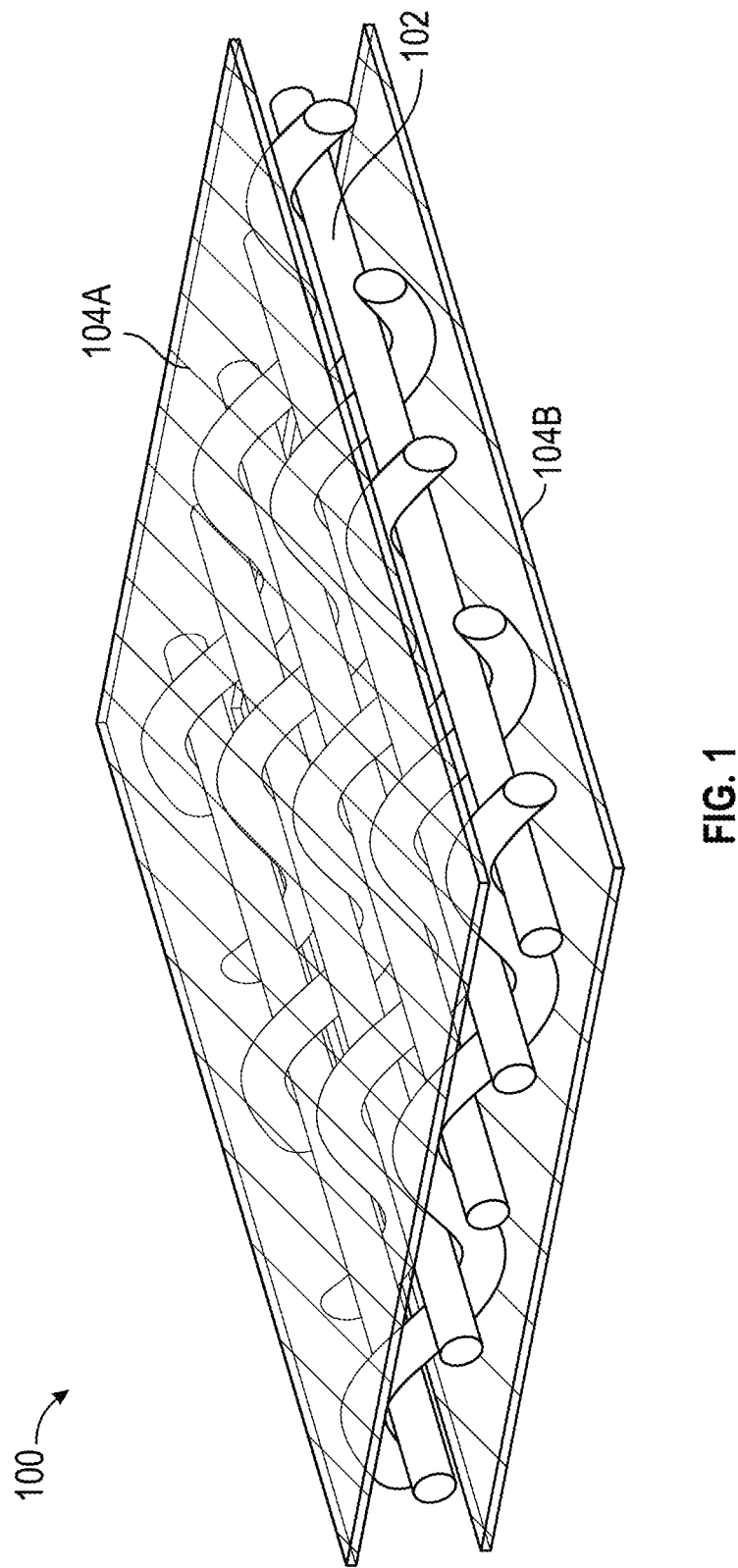
FIG. 1 is a cross-sectional view of a fabric or flexible composite material with a substrate and hot melt adhesive, the fabric or flexible composite material for an inflatable safety product according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are fabrics or flexible composite materials for inflatable safety products that include a substrate and a hot melt adhesive. While the fabrics or flexible composite materials are discussed for use with inflatable safety products such as evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions, they are by no means so limited. Rather, embodiments of the fabrics or flexible composite materials may be used in fabric related applications of any type of inflatable safety product or otherwise as desired.

In various embodiments, the fabric or flexible composite materials described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

In certain embodiments, the fabrics or flexible composite materials described herein may be solvent-free and environmentally friendly compared to traditional fabrics or flexible composite materials while still maintaining seam adhesion and gas barrier properties when exposed to a heat source, aging, and/or fluids exposure. In some embodiments, the fabrics or flexible composite materials described herein may have a reduced weight compared to traditional fabrics or flexible composite materials. As non-limiting examples, the fabrics or flexible composite materials described herein may have a weight less than 8 ounces/yd$^2$, such as less than 6 ounces/yd$^2$, such as less than 5 ounces/yd$^2$, such as less than 4 ounces/yd$^2$, such as less than 3 ounces/yd$^2$, such as less than 2 ounces/yd$^2$, such as less than 1 ounce/yd$^2$, such as less than 0.5 ounces/yd$^2$. The fabrics or flexible composite materials described herein may also have improved manufacturing compared to the manufacturing processes of traditional fabrics or flexible composite materials and may have a short cure time and long shelf life. In some embodiments, the fabrics or flexible composite materials described herein may have an emissivity of 0.48 or less, such as 0.25 while maintaining seam adhesion and gas barrier properties. An emissivity of 0 would mean that the fabric or flexible composite material reflects all heat, and a temperature of the fabric or flexible composite material would not significantly change when exposed to radiant heat. Conversely, an emissivity of 1 would mean that the fabric or flexible composite material is a perfect absorber, and all the heat would be absorbed. Various other advantages and benefits may be realized with the systems and methods described herein, and the aforementioned benefits should not be considered limiting.

Figure 2:
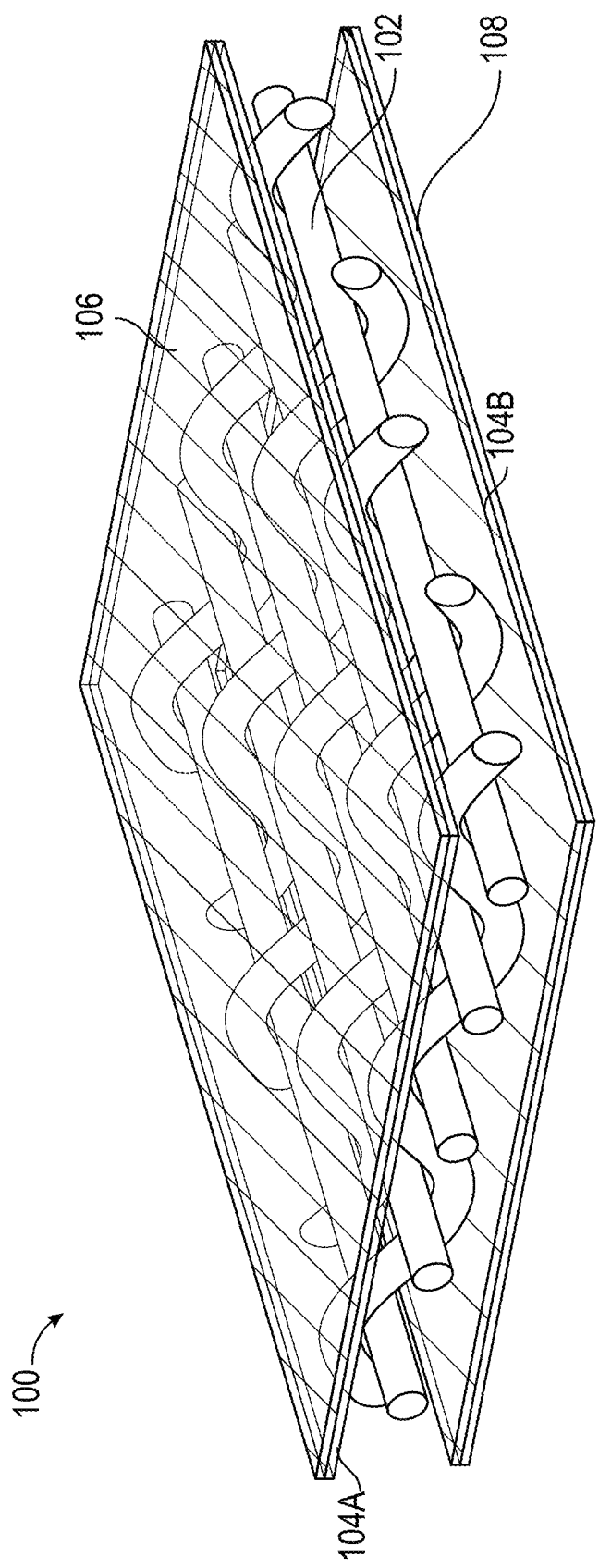
FIG. 2 is a cross-sectional view of the fabric or flexible composite material of FIG. 1 with an outer layer and an inner layer.

FIGS. 1 and 2 illustrate an example of a portion of a fabric or flexible composite material 100 for an inflatable safety product according to embodiments. The fabric or flexible composite material 100 may be provided at various locations and/or form various portions of an inflatable safety product, optionally with different functionalities. As non-limiting examples, the fabric or flexible composite material 100 may be a gas-holding fabric or flexible composite material, a seam tape fabric or flexible composite material, a floor fabric or flexible composite material, a sliding surface fabric or flexible composite material, a girt fabric or flexible composite material, a patch fabric or flexible composite material, a handle fabric or flexible composite material, a pouch fabric or flexible composite material, a container fabric or flexible composite material, a structural attachment fabric or flexible composite material, an accessory fabric or flexible composite material, a component fabric or flexible composite material, or the like. Non-limiting examples of inflatable safety products with the fabric or flexible composite material 100 include, but are not limited to, an inflatable evacuation slide, inflatable evacuation slide/raft, inflatable evacuation ramp, inflatable evacuation slide/ramp, an inflatable life raft, an inflatable life vest, and/or an inflatable helicopter float, among others.

In certain embodiments, the fabric or flexible composite material 100 may have a weight of less than or approximately 8 ounces/yd$^2$. In some embodiments, the weight of the fabric or flexible composite material 100 is less than or approximately 6 ounces/yd$^2$, such as less than or approximately 5 ounces/yd$^2$. In some embodiments, the weight of the fabric or flexible composite material 100 is less than or approximately 4 ounces/yd$^2$. In some embodiments, the weight of the fabric or flexible composite material 100 is less than or approximately 3 ounces/yd$^2$. In some embodiments, the weight of the fabric or flexible composite material 100 is less than or approximately 2 ounces/yd$^2$. In some embodiments, the weight of the fabric or flexible composite material 100 is less than or approximately 1 ounce/yd$^2$. In some embodiments, the weight of the fabric or flexible composite material 100 is less than or approximately 0.5 ounces/yd$^2$.

As illustrated in FIG. 1, the fabric or flexible composite material 100 generally includes a substrate 102 and at least one hot melt adhesive 104 covering at least a portion of a surface of the substrate 102. In the embodiment illustrated, the fabric or flexible composite material 100 includes a first hot melt adhesive 104A at least partially covering an outer surface of the substrate 102 and a second melt adhesive 104B at least partially covering an inner surface of the substrate 102. Moreover, in certain embodiments, a single side of the substrate 102 may have a plurality of hot melt adhesives, and in such embodiments the plurality of hot melt adhesives need not directly contact each other.

When provided on the outer surface of the substrate 102, and as discussed in detail below in the context of FIG. 1, the at least one hot melt adhesive 104 may provide abrasion resistance and the means to adhere films, seam tapes, components, accessories, and/or other fabrics or flexible composite materials to the outer surface of the substrate 102. When provided on the inner surface of the substrate 102, and as discussed in detail below in the context of FIG. 1, the at least one hot melt adhesive 104 may provide the means to adhere films, seam tapes, components, accessories, and/or other fabrics or flexible composite materials to the inner surface of the substrate 102. When provided on the inner surface of the substrate 102, and as discussed in detail below in the context of FIG. 1, the at least one hot melt adhesive 104 is a gas barrier layer on the substrate 102 to create air-holding or gas-holding fabric properties.

As illustrated in FIG. 2, the fabric or flexible composite material 100 generally includes a substrate 102, at least one hot melt adhesive 104 covering at least a portion of a surface of the substrate 102, and at least one layer or film 106 covering at least a portion hot melt adhesive 104. In the embodiment illustrated in FIG. 2, the fabric or flexible composite material 100 includes a first hot melt adhesive 104A at least partially covering an outer surface of the substrate 102, a layer or film 106 at least partially covering the first hot melt adhesive 104A, a second melt adhesive 104B at least partially covering an inner surface of the substrate 102, and a layer or film 108 at least partially covering the second hot melt adhesive 104B. When provided on the inner surface of the substrate 102, and as discussed in detail below in the context of FIG. 2, the at least one hot melt adhesive 104 may provide the means to adhere a gas barrier layer to the substrate 102 to create air-holding or gas-holding fabric properties.

The substrate 102 may be constructed from various materials as desired. As non-limiting examples, the substrate 102 may be various materials such as but not limited to polyethylene, ultra-high molecular weight polyethylene, polypropylene, polyester, aramid, polyamide, aromatic polyamide, polyolefin, aromatic polyester, polyarylate, other liquid crystal polymers, or nylon, or other suitable substrate material, or any combination thereof. As additional non-limiting examples, the substrate 102 may be a material such as but not limited to those sold under the trade names Dyneema®, Spectra®, Innegra®, Vectran®, Nylon-6, or Nylon 6-6, Technora®, or Kevlar®. In one non-limiting example, the substrate 102 is a polyethylene substrate, such as but not limited to an ultra-high molecular weight polyethylene substrate. In certain embodiments, substrate 102 may have a weight of less than or approximately 4.5 ounces/yd$^2$, such as less than or approximately 3.5 ounces/yd$^2$, such as less than or approximately 3.0 ounces/yd$^2$, such as less than or approximately 2.5 ounces/yd$^2$, such as less than or approximately 2.0 ounces/yd$^2$, such as less than or approximately 1.5 ounces/yd$^2$, such as less than or approximately 1.0 ounce/yd$^2$, such as less than or approximately 0.5 ounces/yd$^2$.

In certain embodiments, the hot melt adhesive 104 may be a thermoplastic hot melt adhesive, thermoset hot melt adhesive, or reactive hot melt adhesive. In various embodiments, the hot melt adhesive 104 is a solvent-free hot melt adhesive, such as but not limited to a solvent-free thermoplastic hot melt adhesive, a solvent-free thermoset hot melt adhesive and/or solvent-free reactive hot melt adhesive. In certain embodiments, an activation temperature or melting temperature of the hot melt adhesive 104 is different from a melting temperature of the substrate 102. In some embodiments, the activation temperature or melting temperature is less than the melting temperature of the substrate.

In some embodiments, the hot melt adhesive is a reactive hot melt adhesive that can be either polyurethane (PUR) hot melts or silane-modified polyolefin (POR) adhesives that have a two-stage curing profile; physical setting and chemical crosslinking curing stage. In some embodiments, the hot melt adhesive is a reactive hot melt adhesive that can be moisture-curing hot melt. Optionally, the moisture-curing hot melt adhesive is solvent-free.

In certain embodiments, the hot melt adhesive 104 and the substrate 102 may have a same base polymer, which may improve compatibility and adhesion of the hot melt adhesive 104 to the substrate 102. As non-limiting examples, the same base polymer for the hot melt adhesive 104 and the substrate 102 may include, but is not limited to, polyethylene, ultra-high molecular weight polyethylene, polypropylene, polyester, polyamide, aromatic polyamide, aramid, polyolefin, aromatic polyester, polyarylate, other liquid crystal polymers, or nylon, or other suitable substrate materials, or any combination thereof.

As one non-limiting example, the base polymer may be polyethylene. While the hot melt adhesive 104 and the substrate 102 may have a same base polymer, as mentioned, a melting temperature or activation temperature of the hot melt adhesive 104 may be different from the melting temperature of the substrate 102. In other embodiments, the hot melt adhesive 104 and the substrate 102 need not have the same base polymer. The hot melt adhesive 104 may include copolymer, polyolefin, polyamide, nylon, low density polyethylene, high density polyethylene, ethylene vinyl acetate, polyester, polyurethane, ester-based polyurethane, ether-based polyurethane, urethane prepolymer, reactive polyurethane or any other suitable material.

In various embodiments, the hot melt adhesive 104 may be solid at room temperature, and the hot melt adhesive 104 may be applied to the inner surface and/or the outer surface of the substrate 102 without requiring a liquid phase of the hot melt adhesive and/or using only heat and pressure. The hot melt adhesive 104 on the inner surface and/or the outer surface of the substrate 102 may allow for additional layers, fabrics, or flexible composite materials to be adhered to the fabric or flexible composite material 100 without requiring solvent-based coatings. Non-limiting examples of such additional layers are discussed in detail below and may include, but are not limited to, films, foils, metallic layers, metalized layers, seam tapes, components, accessories, floor fabrics or flexible composite materials, sliding surface fabrics or flexible composite materials, girt fabrics or flexible composite materials, other fabrics, other flexible composite materials, and/or gas barrier layers. When such additional layers are provided, the hot melt adhesive 104 may be provided between such additional layers and the substrate 102.

Optionally, a fabric or flexible composite material may include a metallic layer to decrease the emissivity of the fabric or flexible composite material and to improve the radiant heat resistance of the fabric or flexible composite material. The metallic layer may be a separate layer adhered to the substrate 102, hot melt adhesive 104, and/or another layer 106, and/or one of the hot melt adhesive 104 and/or other layer 106 may be metallized.

The metallic layer may include various metals or metallic elements as desired, including but not limited to aluminum, aluminum alloys, titanium, titanium alloys, nickel, nickel alloys brass, brass alloys, steel, steel alloys, stainless steel, stainless steel alloy, silver, silver alloy, combinations thereof, and/or any other suitable metal or metallic elements as desired. The metallic layer may be completely covering or discontinuous on the substrate 102, hot melt adhesive 104, and/or another layer 106 as desired. In various embodiments, the metallic layer may be provided as a discrete pattern on the substrate 102, hot melt adhesive 104, and/or another layer 106. In other embodiments, the metallic layer need not form a pattern, and/or the metallic layer may be provided as a plurality of discrete patterns (that may be connected with each other and/or disconnected).

The metallic layer may be deposited, adhered, and/or otherwise positioned to cover at least one surface of the substrate 102, hot melt adhesive 104, and/or other layer 106 using various techniques as desired. As a non-limiting example, the metallic layer may be printed on, adhered to, vapor-deposited, or the like. In some embodiments, the metallic layer is plated on the substrate 102, hot melt adhesive 104, and/or other layer 106, sputtered on the substrate 102, hot melt adhesive 104, and/or other layer 106, or the like. In various embodiments, a metallic foil layer is adhered to the substrate 102, hot melt adhesive 104, and/or another layer 106.

In some embodiments, the metallic layer may form an outer-most layer of the fabric or flexible composite material. However, in other embodiments, it need not be, and the metallic layer may be covered by an exterior layer (and the exterior layer is an outer-most layer). When included, the exterior layer may be various types of materials as desired, and in certain embodiments the exterior layer may protect the metallic layer. In one non-limiting example, the exterior layer may be an acrylic coating, although in other embodiments other suitable materials may be utilized as desired. Optionally, and when included, the exterior layer may include a thin film layer, coating, or other suitable layer that may minimize and/or prevent damage, oxidation, and/or corrosion of the metallic layer. In some embodiments, the metallic layer is covered by an exterior layer to prevent or minimize deterioration of the fabric or flexible composite material due to hydrolysis. In various embodiments, the metallic layer is covered by an exterior layer to promote adhesion to seam tapes, girt materials, floor materials, sliding surface materials, patch materials, accessory materials, component materials, or other materials or components. In various embodiments, the metallic layer is covered by an exterior layer to increase the durability of the metallic layer, fabric, or flexible composite material.

In some embodiments, the exterior layer optionally includes a passivation layer, a parkerized layer, or other suitable layer that may be formed via a controlled oxidation process.

In various aspects, when included, the metallic layer reduces the emissivity of the fabric or flexible composite material 100 to less than or equal to 0.48, such as less than or equal to 0.25. In a non-limiting example, for substrates with a higher melting temperature than polyethylene, an emissivity of 0.48 or lower is sufficient, and substrates with a melting temperature like polyethylene or lower may include an emissivity of 0.25 or less. The reduced emissivity in turn may limit the temperature that the fabric or flexible composite material is heated to when the fabric or flexible composite material is exposed to radiant heat. As a non-limiting example, the metallic layer may limit the temperature an ultra-high molecular weight polyethylene substrate to about 199° F., or about 98° F. less than the melting temperature of the ultra-high molecular weight polyethylene substrate.

FIG. 2 illustrates the fabric or flexible composite material 100 with an outer layer 106 adhered to the substrate 102 via the hot melt adhesive 104A and an inner layer 108 adhered to the substrate 102 via the hot melt adhesive 104B. The outer layer 106 may be various layers of material as desired, such as but not limited to a film layer, a seam tape, component, accessory, foils, metallic layers, metalized layers, a protective coating, and/or other fabrics or flexible composite materials. As non-limiting examples, the outer layer 106 may be acrylic, nylon, polyolefin, modified polyolefin, polyurethane, vinyl, polyethylene (PE), polypropylene (PP), polyamide (PA), fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any appropriate materials. The inner layer 108 may be a gas barrier layer providing an air-tight or gas-tight seal and may be constructed from various materials. As non-limiting examples, the inner layer 108 may be acrylic, nylon, polyolefin, modified polyolefin, polyurethane, vinyl, PE, PP, PA, fluoropolymer, PET, polystyrene, EVOH, PVDC, PC, PVC, PLA, PVOH), ethylene-chlorotrifluoroethylene, PEK, PEEK, PEKK, or any combination thereof, or any appropriate materials, a metallic layer, or any other suitable layer for allowing an inflatable safety product utilizing the fabric or flexible composite material 100 to be inflated with air or other gases. The layers 106, 108 are for illustrative purposes, and in other embodiments, other layers or materials may be utilized as the outer layer 106 and/or the inner layer 108. Moreover, the number of layers adhered to the substrate 102 using the hot melt adhesive(s) 104 should not be considered limiting, and in some embodiments a plurality of layers may be provided on the outer surface and/or inner surface of the substrate 102.

As mentioned, the fabric or flexible composite material 100 may be used for various inflatable products and/or accessories or components for inflatable products as desired. As non-limiting examples, the fabric or flexible composite material 100 may be provided as an inflatable safety product such as but not limited to evacuation slides, evacuation slide/rafts, ramps, slide/ramps, life rafts, life vests, helicopter floats and other life-saving inflatable devices. Relevant inflatable products that can be improved using the fabrics or flexible composite materials of the present disclosure can include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions. As another non-limiting example, the fabric or flexible composite material 100 may be a material for a panel, seam tape, a floor, a sliding surface, a girt, a patch, a handle, a pouch, a container, a structural attachment, an accessory, or a component.

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging.

Seam Adhesion

TSO-C69c Requirement

As a non-limiting example, the fabric or flexible composite material adhered or welded to the fabric or flexible composite material of the inflatable safety product creating a seam region, when separated from the fabric or flexible composite material of the inflatable safety product, at or about a 180° angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 180° angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear

TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.

Tensile and Tear Strength

TSO-C69c Requirement

As a non-limiting example, the fabric or flexible composite material of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).

Air Holding & Gas Holding

TSO-C69c Requirement

As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.

Helium Permeability

TSO-C69c Requirement

As a non-limiting example, the fabric or flexible composite material of the inflatable safety product, when at least 3 specimens are prepared and tested as per Federal Test Method Standard—Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.

Temperature Resistance

TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.

Radiant Heat Resistance

TSO-C69c Requirement

As a further non-limiting example, the fabric or flexible composite material described herein when exposed to a radiant heat flux of 1.5 Btu/ft$^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure

TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis

TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation

TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging

TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability

TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853(a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A fabric or flexible composite material for an inflatable safety product, the fabric or flexible composite material comprising a substrate and a hot melt adhesive on the substrate.

Example 2. The fabric or flexible composite material of any of the preceding or subsequent examples or combination of examples, wherein the hot melt adhesive is solid at room temperature.

Example 3. The fabric or flexible composite material of any of the preceding or subsequent examples or combination of examples, wherein an activation temperature or melting temperature of the hot melt adhesive is different from a melting temperature of the substrate.

Example 4. The fabric or flexible composite material of any of the preceding or subsequent examples or combination of examples, wherein an activation temperature or melting temperature of the hot melt adhesive is less than the melting temperature of the substrate.

Example 5. The fabric or flexible composite material of any of the preceding or subsequent examples or combination of examples, wherein the hot melt adhesive is solvent-free.

Example 6. The fabric or flexible composite material of any of the preceding or subsequent examples or combination of examples, wherein the hot melt adhesive comprises a thermoplastic hot melt adhesive, a thermoset hot melt adhesive, or a reactive hot melt adhesive.

Example 7. The fabric or flexible composite material of any of the preceding or subsequent examples or combination of examples, wherein the hot melt adhesive has a metalized surface.

Example 8. The fabric or flexible composite material of any of the preceding or subsequent examples or combination of examples, wherein the hot melt adhesive is a layer covering only one surface of the substrate.

Example 9. The fabric or flexible composite material of any of the preceding or subsequent examples or combination of examples, wherein the hot melt adhesive is an outer layer covering on the substrate, or an inner layer covering the substrate, or both.

Example 10. The fabric or flexible composite material of any of the preceding or subsequent examples or combination of examples, wherein the hot melt adhesive is configured to adhere at least one of a film, gas barrier layer, a seam tape, a component, an accessory, or other fabric or flexible composite material to the substrate.

Example 11. The fabric or flexible composite material of any of the preceding or subsequent examples or combination of examples, wherein the hot melt adhesive provides abrasion resistance.

Example 12. The fabric or flexible composite material of any of the preceding or subsequent examples or combination of examples, wherein the hot melt adhesive and the substrate comprise a same base polymer.

Example 13. The fabric or flexible composite material of any of the preceding or subsequent examples or combination of examples, wherein the hot melt adhesive and the substrate comprise different base polymers.

Example 14. The fabric or flexible composite material of any of the preceding or subsequent examples or combination of examples, wherein the hot melt adhesive comprises copolymer, polyolefin, polyamide, nylon, low density polyethylene, high density polyethylene, ethylene vinyl acetate, polyester, polyurethane, ester-based polyurethane, ether-based polyurethane, urethane prepolymer, reactive polyurethane or any other suitable material.

Example 15. The fabric or flexible composite material of any of the preceding or subsequent examples or combination of examples, wherein the hot melt adhesive is on both an inner surface of the substrate and an outer surface of the substrate.

Example 16. The fabric or flexible composite material of any of the preceding or subsequent examples or combination of examples, wherein the hot melt adhesive maintains gas barrier properties when exposed to a heat source, aging, or fluids exposure.

Example 17. The fabric or flexible composite material of any of the preceding or subsequent examples or combination of examples, wherein the fabric or flexible composite material comprises a tensile strength of at least 190 lbs/in and a tear strength of at least 13 lbs/in.

Example 18. The fabric or flexible composite material of any of the preceding or subsequent examples or combination of examples, wherein the fabric or flexible composite material comprises an emissivity value of 0.48 or less.

Example 19. The fabric or flexible composite material of any of the preceding or subsequent examples or combination of examples, wherein the fabric or flexible composite material comprises a radiant heat resistance of at least 180 seconds.

Example 20. The fabric or flexible composite material of any of the preceding or subsequent examples or combination of examples, wherein the fabric or flexible composite material when exposed to a radiant heat flux of 1.5 $Btu/ft^2$-sec or greater, wherein a pressure applied to a surface opposite a heat source does not decrease for at least 90 seconds when the surface opposite the heat source is subjected to a higher pressure than a surface subjected to the heat source, wherein an average of a time to pressure decrease of at least 3 specimens of the fabric or flexible composite is at least 180 seconds or greater.

Example 21. The fabric or flexible composite material of any of the preceding or subsequent examples or combination of examples, wherein the fabric or flexible composite material is a gas-holding fabric or flexible composite material, a seam tape fabric or flexible composite material, a floor fabric or flexible composite material, a sliding surface fabric or flexible composite material, a girt fabric or flexible composite material, a patch fabric or flexible composite material, a handle fabric or flexible composite material, a pouch fabric or flexible composite material, a container fabric or flexible composite material, a structural attachment fabric or flexible composite material, an accessory fabric or flexible composite material, a component fabric or flexible composite material.

Example 22. An inflatable safety product comprising the fabric or flexible composite material of any of the preceding or subsequent examples or combination of examples as a panel, gas-holding fabric, seam tape, floor, sliding surface, girt, patch, handle, pouch, container, structural attachment, accessory, or component.

Example 23. The inflatable safety product of any of the preceding or subsequent examples or combination of examples, wherein the inflatable safety product comprises an inflatable evacuation slide, inflatable evacuation slide/raft, inflatable evacuation ramp, or inflatable evacuation slide/ramp, life raft, life vest, or helicopter float.

Example 24. A fabric or flexible composite material for an inflatable safety product, the fabric or flexible composite material comprising a substrate and a hot melt adhesive on the substrate, wherein the substrate and the hot melt adhesive comprise a same base polymer.

Example 25. The fabric or flexible composite material of any of the preceding or subsequent examples or combination of examples, wherein the same base polymer comprises polyethylene.

Example 26. The fabric or flexible composite material of any of the preceding or subsequent examples or combination of examples, wherein the same base polymer comprises polyethylene, ultra-high molecular weight polyethylene, polypropylene, polyester, polyamide, aromatic polyamide, aramid, polyolefin, aromatic polyester, polyarylate, other liquid crystal polymers, or nylon.

Example 27. A method of forming an inflatable safety product, the method comprising forming a fabric or flexible composite material by applying a hot melt adhesive to a substrate using heat and pressure.

Example 28. The method of any of the preceding or subsequent examples or combination of examples, wherein the hot melt adhesive is solid at room temperature.

Example 29. The method of any of the preceding or subsequent examples or combination of examples, wherein the hot melt adhesive is solvent-free.

Example 30. The method of any of the preceding or subsequent examples or combination of examples, wherein the hot melt adhesive and the substrate comprise a same base polymer.

Example 31. The method of any of the preceding or subsequent examples or combination of examples, wherein applying the hot melt adhesive comprises applying the hot melt adhesive on both an inner surface of the substrate and an outer surface of the substrate.

Example 32. The method of any of the preceding or subsequent examples or combination of examples, wherein applying the hot melt adhesive comprises applying the hot melt adhesive between a surface of the substrate and a surface of a film, or gas barrier.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. An inflatable safety product comprising a fabric or flexible composite material, the fabric or flexible composite material comprising (a) a substrate, (b) a hot melt adhesive on the substrate, and (c) a gas barrier film applicable to one or more surfaces of the substrate using the hot melt adhesive, wherein the hot melt adhesive comprises a thermoplastic hot melt adhesive, a thermoset hot melt adhesive, or a reactive hot melt adhesive, and wherein the fabric or flexible composite material comprises a weight less than 8 ounces/yd$^2$, wherein the inflatable safety product is compliant with at least one of TSO-69c from the Federal Aviation Administration (FAA), TSO-C13f, or TSO-C70b as of 2023.

2. The inflatable safety product of claim 1, wherein the hot melt adhesive is solid at room temperature.

3. The inflatable safety product of claim 1, wherein an activation temperature or melting temperature of the hot melt adhesive is different from a melting temperature of the substrate.

4. The inflatable safety product of claim 3, wherein an activation temperature or melting temperature of the hot melt adhesive is less than the melting temperature of the substrate.

5. The inflatable safety product of claim 1, wherein the hot melt adhesive is solvent-free.

6. The inflatable safety product of claim 1, wherein the hot melt adhesive has a metalized surface.

7. The inflatable safety product of claim 1, wherein the hot melt adhesive is a layer covering only one surface of the substrate.

8. The inflatable safety product of claim 1, wherein the hot melt adhesive is an outer layer covering on the substrate, or an inner layer covering the substrate, or both.

9. The inflatable safety product of claim 1, wherein the hot melt adhesive is configured to adhere at least one of a film, gas barrier layer, a seam tape, a component, an accessory, or other fabric or flexible composite material to the substrate.

10. The inflatable safety product of claim 1, wherein the hot melt adhesive provides abrasion resistance.

11. The inflatable safety product of claim 1, wherein the hot melt adhesive and the substrate comprise the same base polymer.

12. The inflatable safety product of claim 1, wherein the hot melt adhesive and the substrate comprise different base polymers.

13. The inflatable safety product of claim 1, wherein the hot melt adhesive is on both an inner surface of the substrate and an outer surface of the substrate.

14. The inflatable safety product of claim 1, wherein the hot melt adhesive maintains gas barrier properties when exposed to a heat source, aging, or fluids exposure.

15. The inflatable safety product of claim 1, wherein the fabric or flexible composite material comprises a tensile strength of at least 190 lbs/in and a tear strength of at least 13 lbs/in.

16. The inflatable safety product of claim 1, wherein the fabric or flexible composite material comprises an emissivity value of 0.48 or less.

17. The inflatable safety product of claim 1, wherein the fabric or flexible composite material comprises a radiant heat resistance of at least 180 seconds.

18. The inflatable safety product of claim 1, wherein the fabric or flexible composite material when exposed to a radiant heat flux of 1.5 Btu/ft$^2$-sec or greater, wherein a pressure applied to a surface opposite a heat source does not decrease for at least 90 seconds when the surface opposite the heat source is subjected to a higher pressure than a surface subjected to the heat source, wherein an average of a time to pressure decrease of at least 3 specimens of the fabric or flexible composite is at least 180 seconds or greater.

19. The inflatable safety product of claim 1, wherein the fabric or flexible composite material is a gas-holding fabric or flexible composite material, a seam tape fabric or flexible composite material, a floor fabric or flexible composite material, a sliding surface fabric or flexible composite material, a girt fabric or flexible composite material, a patch fabric or flexible composite material, a handle fabric or flexible composite material, a pouch fabric or flexible composite material, a container fabric or flexible composite material, a structural attachment fabric or flexible composite material, an accessory fabric or flexible composite material, a component fabric or flexible composite material.

20. The inflatable safety product of claim 1, wherein the inflatable safety product comprises an inflatable evacuation slide, inflatable evacuation slide/raft, inflatable evacuation ramp, or inflatable evacuation slide/ramp, life raft, life vest, or helicopter float.

21. An inflatable safety product comprising a fabric or flexible composite material, the fabric or flexible composite material comprising (a) a substrate, (b) a hot melt adhesive on the substrate, and (c) a gas barrier film applicable to one or more surfaces of the substrate using the hot melt adhesive, wherein the substrate and the hot melt adhesive comprise a same base polymer, wherein the fabric or flexible composite material comprises a weight less than 8 ounces/yd$^2$, and wherein the inflatable safety product is compliant with at least one of TSO-69c from the Federal Aviation Administration (FAA), TSO-C13f, or TSO-C70b as of 2023.

22. A method of forming an inflatable safety product, the method comprising forming a fabric or flexible composite material by applying a hot melt adhesive to a substrate using heat and pressure to apply a gas barrier film to one or more surfaces of the substrate using the hot melt adhesive, wherein the hot melt adhesive comprises a thermoplastic hot melt adhesive, a thermoset hot melt adhesive, or a reactive hot melt adhesive, and wherein the fabric or flexible composite material comprises a weight less than 8 ounces/yd$^2$, wherein the inflatable safety product is compliant with at least one of TSO-69c from the Federal Aviation Administration (FAA), TSO-C13f, or TSO-C70b as of 2023.

23. The method of claim 22, wherein the hot melt adhesive is solid at room temperature.

24. The method of claim 23, wherein applying the hot melt adhesive comprises at least one of:
  applying the hot melt adhesive on both an inner surface of the substrate and an outer surface of the substrate; or
  applying the hot melt adhesive between a surface of the substrate and a surface of a film, or gas barrier.

25. The method of claim 22, wherein the hot melt adhesive is solvent-free.

26. The method of claim 22, wherein the hot melt adhesive and the substrate comprise the same base polymer.

* * * * *